United States Patent
Chen

(10) Patent No.: US 8,848,705 B2
(45) Date of Patent: Sep. 30, 2014

(54) SYSTEM AND METHOD FOR FINDING POINT-TO-MULTIPOINT LABEL SWITCHED PATH CROSSING MULTIPLE DOMAINS

(75) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 124 days.

(21) Appl. No.: 13/400,513

(22) Filed: Feb. 20, 2012

(65) Prior Publication Data

US 2012/0213224 A1 Aug. 23, 2012

Related U.S. Application Data

(60) Provisional application No. 61/444,796, filed on Feb. 21, 2011.

(51) Int. Cl.
*H04L 12/28* (2006.01)
*H04L 12/56* (2006.01)
*H04L 12/26* (2006.01)
*H04L 12/16* (2006.01)
*H04L 12/721* (2013.01)
*H04L 12/715* (2013.01)
*H04L 12/723* (2013.01)
*H04L 12/717* (2013.01)

(52) U.S. Cl.
CPC ............... *H04L 45/04* (2013.01); *H04L 45/12* (2013.01); *H04L 45/50* (2013.01); *H04L 45/42* (2013.01); *H04L 45/44* (2013.01)
USPC .......................... 370/389; 370/392; 370/238

(58) Field of Classification Search
CPC ..... H04L 45/12; H04L 45/122; H04L 45/123; H04L 45/00
USPC ............... 370/392, 389, 238, 256, 241, 224
See application file for complete search history.

(56) References Cited

FOREIGN PATENT DOCUMENTS

WO 2009117971 A1 1/2009

OTHER PUBLICATIONS

H. Chen, "A Forward-Search P2MP TE LSP Inter-Domain Path Computation", Mar. 7, 2011, IETF, all pages (13).*
Awduche, D., et al., "RSVP-TE: Extensions to RSVP for LSP Tunnels," RFC 3209, Dec. 2001, 57 pages.
Bradner, S., "Key Words for Use in RFCs to Indicate Requirement Levels," RFC 2119, Mar. 1997, 3 pages.
Farrel, A., et al., "A Path Computation Element (PCE)-Based Architecture," RFC 4655, Aug. 2006, 38 pages.
Vasseur, JP., et al., "Path Computation Element (PCE)Communication Protocol (PCEP)," RFC 5440, Mar. 2009, 88 pages.
Vasseur, JP., et al., "A Backward-Recursive PCE-BAsed Computation (BRPC) Procedure to Compute Shortest Constrained Inter-Domain Traffic Engineering Label Switched Paths," RFC 5441, Apr. 2009, 19 pages.

(Continued)

*Primary Examiner* — Kwang B Yao
*Assistant Examiner* — Adam Duda
(74) *Attorney, Agent, or Firm* — Conley Rose, P.C.; Grant Rodolph; William H. Dietrich

(57) ABSTRACT

An apparatus associated with a first domain, the apparatus comprising a processor configured to compute a portion of a Point-to-Multipoint (P2MP) path, wherein the P2MP path spans a plurality of domains including the first domain, wherein the apparatus does not require knowledge of a core tree of domains to compute the portion of the P2MP path.

20 Claims, 11 Drawing Sheets

(56) References Cited

OTHER PUBLICATIONS

Yasukawa, S., et al., "Path Computation Clients (PCC)—Path Computation Element (PCE) Requirements for Point-to-Multipoint MPLS-TE," RFC 5862, Jun. 2010, 11 pages.

Zhao, Q., Ed., et al., "Extensions to the Path Computation Element Communication Protocol (PCEP) for Point-to-Multipoint Traffic Engineering Label Switched Paths," RFC 6006, Sep. 2010, 33 pages.

Zhao, Q., et al., "PCE-Based Computation Procedure to Compute Shortest Constrained P2MP Inter-domain Traffic Engineering Label Switched Paths," draft-zhao-pce-pcep-inter-domain-p2mp-procedures-06, Oct. 25, 2010, 20 pages.

Ali, Z., et al., "BRPC Extensions for Point-to-Multipoint Path Computation," draft-ali-pce-brpc-p2mp-ext-01.txt, Jul. 12, 2009, 11 pages.

Foreign Communication From a Related Counterpart Application, PCT Application PCT/US2012/025821, International Search Report dated Apr. 20, 2012, 5 pages.

Foreign Communication From a Related Counterpat Application, PCT Application PCT/US2012/025821, Written Opinion dated Apr. 20, 2012, 9 pages.

* cited by examiner

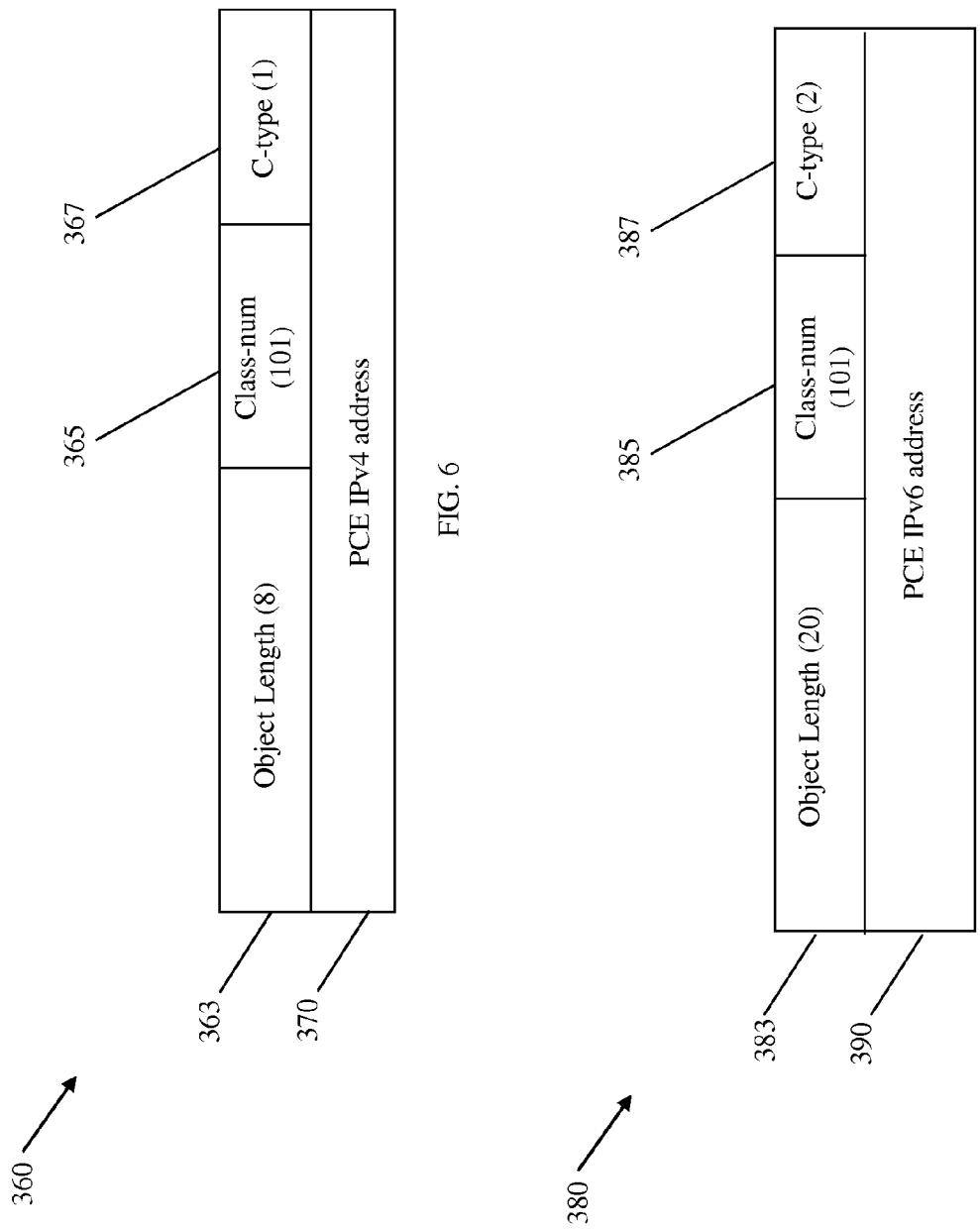

US 8,848,705 B2

SYSTEM AND METHOD FOR FINDING POINT-TO-MULTIPOINT LABEL SWITCHED PATH CROSSING MULTIPLE DOMAINS

CROSS-REFERENCE TO RELATED APPLICATIONS

The present application claims priority to U.S. Provisional Patent Application 61/444,796, filed Feb. 21, 2011 by Huaimo Chen, and entitled "Finding Point-to-Multipoint Label Switched Path Crossing Multiple Domains," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Routing in packet-switched networks between a source and one or more destinations presents many challenges. Routing issues may be particularly acute in Multiprotocol Label Switching (MPLS) networks which use a Point-to-Multipoint (P2MP) Traffic Engineering (TE) Label Switched Path (LSP) crossing a number of domains, due in part to having to compute a route for each of a number of destinations and due in part to having to compute routes potentially spanning multiple domains.

In some networks, such as MPLS networks, a TE P2MP LSP may be established using a Resource Reservation Protocol-TE (RSVP-TE) for a given path. A path can be computed by a Path Computation Client (PCC) and/or a Path Computation Element (PCE). For example, the PCC may request a path or route from a PCE, which computes the path and sends the computed path information back to the PCC. The path may be a P2MP path from a source node to a plurality of destination nodes, which crosses a plurality of domains, where a domain may be a collection of network elements within a common sphere of address management or path computational responsibility, such as an Interior Gateway Protocol (IGP) area or an Autonomous System.

Previous systems and methods for routing or determining a P2MP LSP may suffer from numerous drawbacks, including that a sequence of domains (sometimes referred to as a core tree of domains) from a source to multiple destinations must be known in advance, and there may be no guarantee that a path crossing multiple domains computed is shortest. The Internet Engineering Task Force (IETF) draft-zhao-pce-pcep-inter-domain-p2 mp-procedures-06 entitled "PCE-based Computation Procedure to Compute Shortest Constrained P2MP Inter-domain Traffic Engineering Label Switched Paths", which is incorporated herein by reference, describes one procedure that relies on the use of multiple PCEs to compute an MPLS TE P2MP LSP path across a plurality of domains. The procedure suffers from some of the drawbacks discussed above.

SUMMARY

In one aspect, the invention includes an apparatus associated with a first domain, the apparatus comprising a processor configured to compute a portion of a P2MP path, wherein the LSP spans a plurality of domains including the first domain, wherein the apparatus does not require knowledge of a core tree of domains to compute the portion of the P2MP path.

In another aspect, the invention includes a method comprising computing a portion of a P2MP path in an apparatus associated with a first domain, wherein the LSP spans a plurality of domains including the first domain, wherein the method does not require knowledge of a core tree of domains to compute the portion of the P2MP path.

In yet another aspect, the invention includes a system comprising a plurality of PCEs coupled to each other, wherein each of the PCEs is coupled to a different domain in a network, wherein the PCEs are configured to cooperatively compute a P2MP path from a source in one of the domains to a plurality of destinations in the domains without knowledge of a core tree of domains.

In yet another aspect, the invention includes an apparatus comprising a processor configured to receive a request from a network entity for computing a MPLS P2MP LSP, wherein the request comprises ResultPathTree, RestDestinationNodes, and CandidateNodeList, determine a node C with minimum cost based on CandidateNodeList, determine whether a current PCE is a PCE responsible for node C, and, if so, remove C from CandidateNodeList, graft it into ResultPathTree, and grow the ResultPathTree from node C, and, if not, send a request message to the PCE responsible for node C.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is an illustration of one embodiment of a PCE Internet Protocol version 4 (IPv4) address object.

FIG. 7 is an illustration of one embodiment of a PCE Internet Protocol version 6 (IPv6) address object.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Systems and methods discussed herein may resolve some of the issues discussed earlier in that it may not be necessary for a sequence of domains between a source and destination(s) to be known, and a path crossing multiple domains between a source and a given set of destinations may be the shortest path between the source and the destination. Further, extensions to the Path Computation Element Communication Protocol (PCEP) for supporting the forward search procedure are described. For example, embodiments described herein provide for extensions to PCEP, which include the definition of a new flag in the Request Parameters (RP) object, a result path list/tree, and a candidate node list in a request message.

Figure 1:
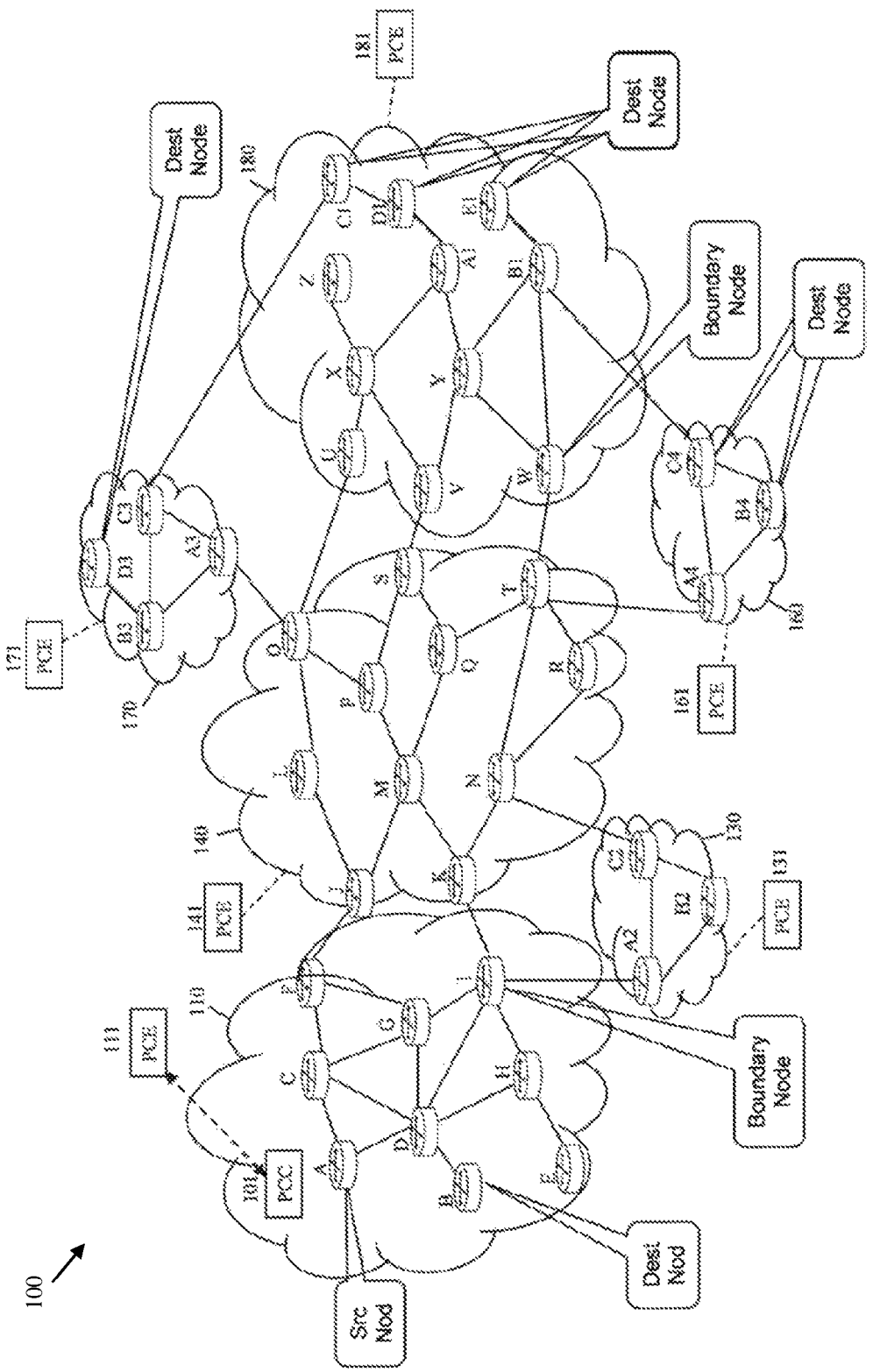
FIG. 1 is an embodiment of a network comprising multiple domains.

FIG. 1 is an embodiment of a network 100 comprising multiple domains 110, 130, 140, 160, 170, and 180 interconnected as shown in FIG. 1. Each domain comprises a plurality of nodes. For example, domain 110 comprises nodes A through I as shown in FIG. 1. The other domains contain other nodes as shown in FIG. 1. Each node may have data, such as multicast video, ready to transmit to a plurality of other nodes. The embodiment of network 100 in FIG. 1 illustrates one example of a source node A and a plurality of destination nodes B, C1, D1, E1, D3, B4, and C4, i.e., there are seven destination nodes in this example. Each domain has an associated PCE. In this embodiment, PCE 111 may be associated with domain 110, PCE 131 may be associated with domain 130, PCE 141 may be associated with domain 140, PCE 161 may be associated with domain 160, PCE 171 may be associated with domain 171, and PCE 181 may be associated with domain 180. A PCE, such as the aforementioned PCEs, may be an entity, such as a component, an application, or a network node, that may be capable of computing a network path or route based on a network graph and applying computational constraints.

At some time after source node A has data ready to send to its destination nodes, a PCC associated with node A may send a request to PCE 111. A PCC may be a client application configured to request a path computation to be performed by a PCE. A node, such as node A, may comprise a PCC. The PCEs may cooperate with each other to determine the best or shortest path from a source to multiple destinations spanning a plurality of domains. For example, the shortest path from source node A to destination node C1 may be A-C-F-J-L-O-A3-C3-C1. That is, the shortest path lies in the sequence of domains 110-140-170-180. As discussed previously, a problem with previous approaches may be that a core tree of domains must be provided. If the core tree domain path from source domain 110 to destination domain 180 is 110-140-180 and this core tree is provided to a conventional method, it may be impossible for the shortest path to be determined. The operation of some procedures, algorithms, or methods for determining a MPLS TE P2MP LSP identify whether a node is a boundary node. A boundary node may be a node used to connect two domains together. For example, nodes F, I, J, and K in FIG. 1 may be boundary nodes. Further, a boundary node may be either an area border router (ABR, i.e., a router used to connect two IGP areas in the context of inter-area Traffic Engineering) or an autonomous system (AS) border router (ASBR, i.e., routers used to connect together ASes of the same or different service providers via one or more inter-AS links) in the context of inter-AS Traffic Engineering. An entry boundary node of an nth domain may be a boundary node connecting domain(n−1) to domain(n) along the path found from the source node to the boundary node, where domain (n−1) is the previous hop domain of domain(n). Finally, an exit boundary node of an nth domain may be a boundary node connecting domain(n) to domain(n+1) along the path found from the source node to the boundary node, where domain (n+1) is the next hop domain of domain(n).

Some general characteristics of a procedure or method for computing a shortest P2MP path from a source node to a plurality of destination nodes, which may be used to establish an MPLS TE P2MP LSP crossing multiple domains, disclosed herein may be as follows. The procedure may be referred to as a Forward Search Path Computation (FSPC) procedure using multiple PCEs. This procedure may guarantee that the path found from the source node to the destination nodes is shortest. Further, the procedure may not depend on a sequence of domains from the source node to a destination node. PCEs may cooperate with each other to determine the best or shortest path from a source to multiple destinations spanning a plurality of domains. The cooperation may comprise passing messages (e.g., requests) from one PCE to another with each PCE computing a portion of a TE P2MP path. Navigating a mesh of domains may be simple and efficient.

A FSPC procedure for computing a shortest path from a source node to a plurality of destination nodes for an MPLS TE P2MP LSP crossing a plurality of domains starts at a source domain, in which the source (or ingress) node of the MPLS TE P2MP LSP is located. When a PCE in the source domain receives a request for computing the path for the MPLS TE P2MP LSP, the PCE computes the shortest path from the source node to every exit boundary node of the domain towards the destination nodes.

There may be two path lists involved in the FSPC procedure. One path list may be referred to as a candidate path list, which contains the temporary shortest paths from the source node to the boundary nodes or one or more destination nodes currently found. The paths in the candidate list are ordered by the cost of the path. Initially, the candidate path list contains only source node with cost zero. The other list may be referred to as a result path list or tree, which contains the final shortest paths from the source node to the boundary nodes or one or more destination nodes. Initially, the result path list is empty.

When a PCE responsible for a domain (referred to as the current domain) receives a request to compute a path for the MPLS TE P2MP LSP, the PCE removes a path with the minimum cost from the candidate path list and inserts or grafts the path to the result path list. If the shortest paths to all the destination nodes are found, then a reply with the shortest paths is sent to the PCE or PCC from which the request is received. Otherwise (i.e., if there are some destinations not on the result path tree), the PCE computes the shortest path from the source node via an entry boundary node to every exit boundary node and destination node of the current domain and further to the entry boundary nodes of the domain connected to the current domain, puts the new path into the candidate list in order by some metric (e.g., path cost), updates the existing path in the candidate path list with the new path with a better metric (e.g., lower cost), and then sends a request with the new candidate path list to the PCE that is responsible for the domain with the entry boundary node as the tail end of the path with the best metric (e.g., minimum cost) in the candidate path list. Cost may refer to any of a number of path metrics, such as shortest path, least loaded path, least used path, most reliable path, etc. In determining a shortest path between a source and a destination, cost may refer to a number of links between a source and a node of interest on a candidate path.

Figure 2:
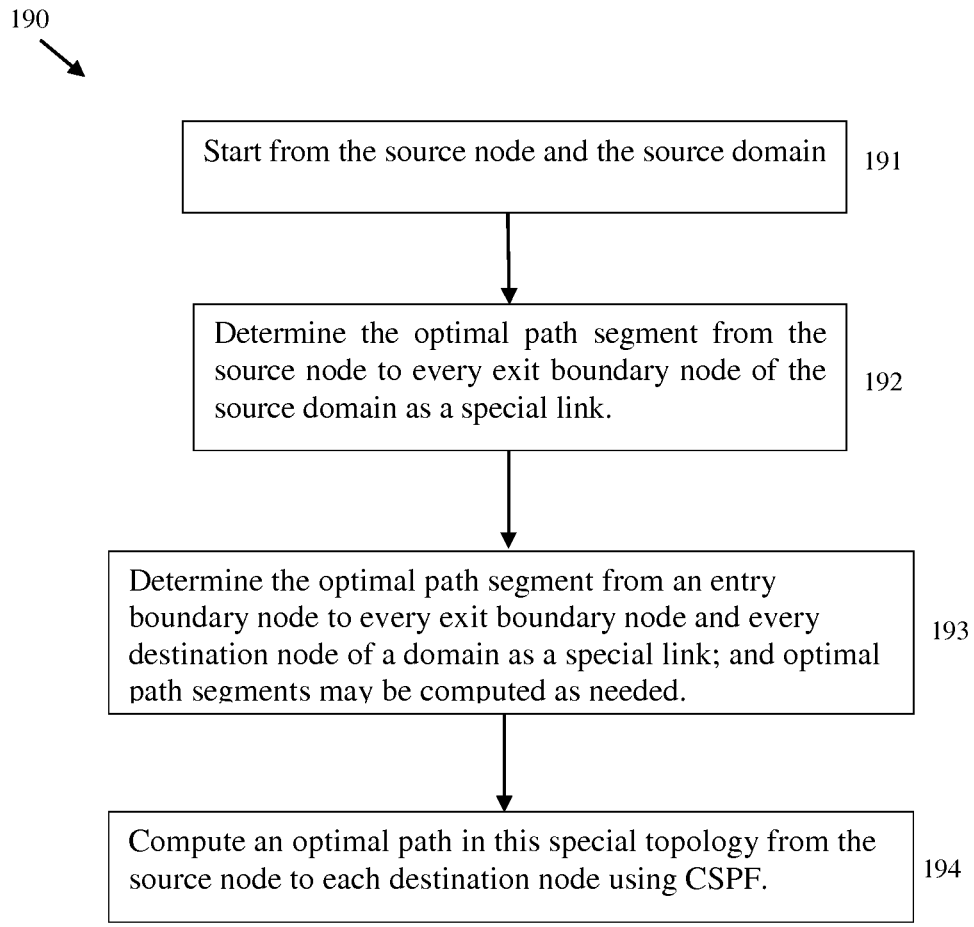
FIG. 2 is an embodiment of a method for determining a P2MP path across a plurality of domains.

FIG. 2 is an embodiment of a method 190 for determining a P2MP path across a plurality of domains. In step 191, the method starts from a source node. The domain containing the source node may be referred to as a source domain. In step 192, optimal path segments from the source node to every exit boundary node of the source domain may be determined as a special link. In step 193, optimal path segments from an entry boundary node to every exit boundary node and every destination node of a domain may be determined as a special link; and optimal path segments may be computed as needed. A network topology comprising a plurality of domains can be considered as a special topology, which contains special links, and inter-domain links. In step 194, a shortest path in this special topology may be computed from the source node to each destination node using a constrained shortest path first (CSPF) algorithm. A Forward Search P2MP inter-domain path computation method running at any PCE may grow a result path list/tree in the same way as normal CSPF on the special topology. When the result path list/tree reaches all the destination nodes, the shortest paths from the source node to the destination nodes is found and a reply message with the shortest path may be sent to a PCE/PCC that sent the initial request message. The method 190 does not require a core tree of domains and results in a shortest P2MP path across a plurality of domains (i.e., a computed path from a source to a destination is a shortest path or optimum path from the source to the destination; for n destinations, where n is an integer greater than one, there may be n paths, each of which is the shortest path from the source to the destination).

Figure 3:
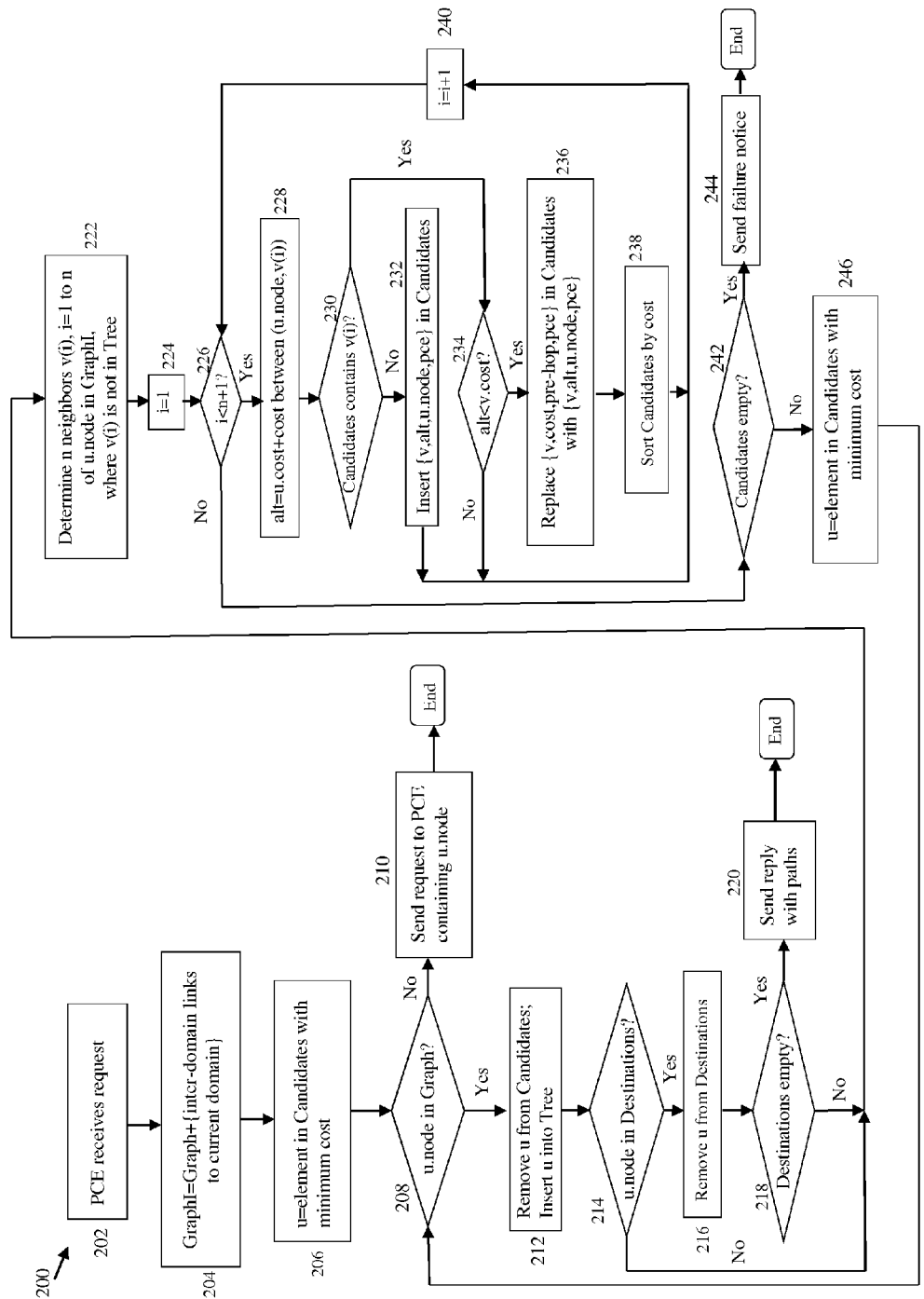
FIG. 3 is an embodiment of a second method for determining a P2MP path across a plurality of domains.

FIG. 3 is an embodiment of a second method 200 for determining a P2MP path across a plurality of domains. The method 200 may be performed in a PCE. In step 202, a PCE receives a request to compute a P2MP path or a portion of a P2MP path. A PCE may compute a portion of a P2MP path within the domain for which the PCE is responsible. The request may be received from a PCC of a source or from another PCE. The request may contain variables Source, Destinations, Tree, and Candidates. Source may be the source node; Destinations may be a list of destination nodes; Tree may be a shortest path tree at the time of the PCE request; and Candidates may be information about candidate paths. Each element in Candidates may have a form of {node, cost, pre-hop, and pce}, where cost is the cost from Source to node, pre-hop is the previous hop of node on the path from source to node, and pce is the PCE responsible for the domain containing node. In an initial request from a PCC corresponding to Source, Tree may be empty and Candidates may equal {Source, 0, -, pce}.

The PCE receiving a request may have an internal variable Graph which is a topology graph of the domain (i.e., a list of nodes in the domain and all their interconnections within the domain) for which the PCE is responsible. In step 204, GraphI is set equal to Graph (i.e., a topology graph of the current domain) plus the inter-domain links connected to the current domain. In step 206, u is selected as the element in Candidates with minimum cost. The variable u may be the name of an object, with node, cost, and pce as members of the object, which may be referenced as u.node, u.cost, and u.pce, respectively. In step 208, a determination is made whether u.node is in Graph, i.e., whether u.node is in the current domain. If not, in step 210 a request to compute a P2MP path (or a portion of a P2MP path) is sent to the PCE responsible for the domain containing u.node. When the PCE responsible for the domain containing u.node receives the request, it may follow the method 200 starting with step 202. If u.node is in Graph (i.e., u.node is in the current domain), the method proceeds to step 212, in which u may be removed from Candidates and inserted into Tree. Next in step 214, a determination is made whether u.node is in Destinations (i.e., u.node is a destination node). If so, the method 200 proceeds to step 216 in which u may be removed from Destinations. Next, in step 218 a determination is made whether Destinations is empty (i.e., all destinations are on Tree). If so, a reply with the shortest path from the source to the destinations is sent to the PCC or PCE that sent the request. If Destinations is not empty at step 218, the method 200 proceeds to step 222, whereas if Destinations is empty at step 218, the method proceeds to step 220. If Destinations is empty at step 218, this implies that the shortest path from a source to all destinations may be found, and a reply may be sent to the PCC or PCE from which a request was received. If u.node is not in Destinations in step 214, the method also proceeds to step 222.

In step 222, the neighbors of u.node in GraphI are determined, where n represents the number of neighbors, and v(i) is the ith neighbor. In step 224, i is set equal to one. A determination is made whether i is less than n+1 in step 226, and if so, the method proceeds to step 228. In step 228, alt is computed as the sum of u.cost plus the cost between u.node and v(i). In many applications, the cost between a node, such as u.node, and a neighbor, such as v(i), may be one. In step 230, a determination is made whether Candidates contains v(i). If not, the method proceeds to step 232, in which {v(i), alt, u.node, pce} is inserted into Candidates. If so, the method proceeds to step 234. In step 234, a determination is made whether alt is less than v.cost. If so, {v,cost,pre-hop,pce} in Candidates is replaced with {v,alt,u.node,pce} at step 236. In step 238, Candidates may be sorted according to cost. Next in step 240, i is set equal to i+1, and the process goes back to step 226. In step 226, if i is not less than n+1, the process goes to step 242. In step 242, a determination may be made whether Candidates is empty. If so, at 244 a failure notice is sent to the PCC or PCE from which the request is received. If Candidates is not empty, the method 200 continues to step 246, in which u is selected as an element from Candidates with minimum cost. If there is more than one element with the same minimum cost, any of the elements with the same minimum cost may be selected. Then the method 200 goes to step 208, which is repeated. The method repeats until Destinations is empty in step 218 or until an u.node is selected that is not in the current domain. The method 200 does not require a core tree of domains and results in a shortest P2MP path across a plurality of domains (i.e., a computed path from a source to a destination is a shortest path or optimum path from the source to the destination; for n destinations, where n is an integer greater than one, there may be n paths, each of which is the shortest path from the source to the destination).

The method 200 in FIG. 3 may be implemented as an algorithm in pseudo-code. The following are three algorithms—Algorithms 1, 2, and 3—implemented in pseudo-code that determines a shortest P2MP path across a plurality of domains. The algorithms do not rely on being provided any core trees, domain path trees, or domain sequences. Algorithm 1 may implement method 200 in pseudo code. In Algorithm 1, when a PCE receives a request, the PCE decodes the request and then calls function P2 mpPathXDomains1, which is a function of Graph, Source, Destinations, Tree, and Candidates, which are described above with respect to method 200. The function P2 mpPathXDomains1 in Algorithm 1 is given below.

```
function P2mpPathXDomains1(Graph, Source, Destinations, Tree, Candidates):
    GraphI = Graph + {inter-domain links connected to current domain};
    u = element in Candidates with minimum cost;
    while (u.node is in Graph) // u.node is in the current domain
        remove u from Candidates; insert u into Tree;
        if (u.node is in Destinations) // if u.node is a destination
            remove u.node from Destinations;
            if (Destinations is empty) //The shortest path from source to all
                                      //destinations found
                send reply with the path to PCC/PCE from which request is
                received;
                return
            end if;
        end if;
        for (each neighbor v of u.node in GraphI and v is not in Tree):
            alt = u.cost + cost-between(u.node, v);// get the cost from source to v
            if (Candidates does not contain x,where x.node == v)//if v not in Candidates
                insert {v, alt, u.node, pce} into Candidates;
            else if (alt < v.cost) // if {v, cost, pre-hop,pce} in Candidates
                replace{v,cost,pre-hop,pce} in Candidates with {v,alt,u.node,pce};
                sort Candidates by cost;
            end if;
        end for;
        if (Candidates is not empty)
            u = element in Candidates with minimum cost;
        else
            send reply with failure to PCC/PCE from which request is received;
            return;
        end if;
    end while;
    // Here we have that u.node is not in Graph (i.e., u.node is not in the current domain)
    Send a request to PCE responsible for the domain containing u.node;
    // the request contains Source, Destinations, Tree, Candidates;
    Return;
```

Algorithm 1 (and the related method 200 in FIG. 3) may be a simple and efficient algorithm for determining a P2MP path across a plurality of domains. However, Algorithm 1 may have a drawback that a Request may be large since it may contain all the information about the result Tree and Candidates. Further, the information in one domain may be exposed to others in the result Tree and Candidates. Finally, a Request may be sent among different domains backwards as well as forwards since Tree may grow in a first domain (e.g., Domain A) and then in a second domain (e.g., Domain B), and then in the first domain (e.g., Domain A) again, and so on.

The following algorithm, referred to as Algorithm 2, may address a few of the above issues. When a first PCE running Algorithm 2 sends a request to a second PCE, the first PCE stores the information belonging to its domain in the PCE responsible for the domain with keys and sends a request to a second PCE with the keys. If a request is passed back to the PCE for the current domain, the information belonging to the current domain can be restored through the keys, and the computation of the P2MP path crossing multiple domains can be continued.

In Algorithm 2, when a PCE receives a request, the PCE decodes the request and then calls function P2 mpPathXDomains2, which is a function of Graph, Source, Destinations, Tree, and Candidates. The function P2 mpPathXDomains2 in Algorithm 2 is given below.

```
function P2mpPathXDomains2(Graph, Source, Destinations, Tree, Candidates):
    restore-part-tree(Graph, Tree, Candidates);//restore info stored
    GraphI = Graph + (inter-domain links connected to current domain);
    u = element in Candidates with minimum cost;
    while (u.node is in Graph) // u.node is in the current domain
        remove u from Candidates; insert u into Tree;
        if (u.node is in Destinations) // if u.node is a destination
            remove u.node from Destinations;
            if (Destinations is empty) //if the shortest path from source to all
                                      //destinations is found
                send reply with the path to PCC/PCE from which request is
                received;
                return;
            end if;
        end if;
        for (each neighbor v of u.node in GraphI and v is not in Tree):
            alt = u.cost + cost-between(u.node, v); // get the cost from source to v
            if (Candidates does not contain x,where x.node ==v) //if v not in Candidates
                insert {v,alt,u.node,pce} into Candidates;
            else if (alt < v.cost) // if {v, cost, pre-hop,pce} in Candidates
                replace{v,cost,pre-hop,pce} in Candidates with {v,alt,u.node,pce};
                sort Candidates by cost;
            end if;
        end for;
        if (Candidates is not empty)
            u = element in Candidates with minimum cost;
```

```
                else // tree cannot be extended any more
                    send reply with failure to PCC/PCE from which request is received;
                    return;
                end if;
    end while;
    // Here we have that u.node is not in Graph (i.e., current domain)
    store-part-tree(Graph,Source,Destinations,Tree,Candidates,Tree2send,Candidates2send);
    // stores each path segment
    //   from an entry boundary node or source to a destination in current domain with a key
    //   from an entry boundary or source to an exit boundary in current domain with a key
    // stores part of the result tree containing the information in current domain with a key
    // stores part of the Candidates containing the information in current domain with a key
    // Tree2send = Tree − information in current domain + keys for path segments and info
    // Candidates2send = Candidates − information in current domain + keys for information
    Send a request to PCE responsible for the domain containing u.node;
    // request contains Source, Destinations, Tree2send, Candidates2send;
    Return;
```

When a PCE receives a reply with the result, the PCE forwards the reply to the PCC/PCE from which a request for computing a path for a P2MP LSP crossing domains is received. Function P2 mpPathXDomains2 in Algorithm 2 relies on function store-part-tree, which is a function of Graph, Source, Destinations, Tree, Candidates, Tree2send, Candidates2send and which is provided below.

```
function store-part-tree(Graph, Source, Destinations, Tree,
         Candidates,Tree2send,Candidates2send):
Candidates2key = { };
minCost = maxNumber;
Candidates2send = Candidates; // copy Candidates to Candidates2send
// remove every piece of information belonging to current domain from Candidates2send
// collect all pieces, get the minimum cost from the source among all pieces,
// store it in PCE with a key, and add {key, node, minCost, pre-hop,pce} into Candidates2send
for (each u in Candidates2send and u.node in Graph)
    remove u from Candidates2send; // remove each piece in current domain
    add u into Candidates2key; // add all pieces in current domain to Candidates2key
    if (u.cost < minCost)
         minCost = u.cost; m = u; // get the minimum cost among all pieces
    end if;
end for;
store Candidates2key in PCE and get a key for accessing it later;
add a special element {key, m.node, minCost, m.pre-hop,pce} into Candidates2send;
// get path segments from source (entry boundary) node to destination (exit boundary) node
// remove the segments from Tree, store the segments in PCE with keys
// add {key, exit-boundary/destination, cost, entry-boundary/source,pce} into Tree2send
Tree2send = Tree;
for (each u in Tree2send and u.node in Graph and u.node is destination or boundary node)
    remove u from Tree2send;
    PathSegment2key = {u};
    b = u.node; cost = u.cost;
    for (each v in Tree2send and v.node in Graph and v.node == u.pre-hop)
         remove v from Tree2send;
         add v into PathSegment2key;
         u = v;
         if (v.node is a boundary node or source)
             store PathSegment2key in PCE and get a key for accessing it later;
             add a special element {key, b, cost, v.node,pce} into Tree2send;
             break;
         end if;
    end for;
end for;
// remove every piece of information belonging to current domain from Tree2send
// collect all pieces, store it in PCE with a key, and
// add {key, n, cost, ph, pce} into Tree2send, where n is a node in Graph and
// {n,cost,ph,pce} is in Tree2send.
Tree2key = { };
for (each u in Tree2send and u.node in Graph and u is not with key)
    remove u from Tree2send; add u into Tree2key; n=u.node, ph=u,pre-hop;
end for;
store Tree2key in PCE and get a key for accessing it later;
add a special element {key, n, cost, ph, pce} into Tree2send;
return;
```

Function store-part-tree relies on function restore-part-tree which is provided below.

```
function restore-part-tree(Graph,Tree,Candidates):
        // Restore the Candidates
        //  for the information belonging to current domain stored in PCE with key before,
        //   get the information with key and add it into Candidates
        for (each u = {key, node, cost, pre-hop, pce} in Candidates and u.node in Graph)
                remove u from Candidates;
                get candidates into CandidatesFromKey by key; //get candidates stored with key
                for (each v in CandidatesFromKey)
                        insert v into Candidates; // insert v into Candidates, keep it sorted by cost
                end for;
        end for;
        // Restore the Tree
        //  for the information belonging to current domain stored in PCE with key before,
        //   get the information with key and add it into Tree
        for (each u = {key, node, cost, pre-hop, pce}in Tree and u.node in Graph)
                remove u from Tree;
                get part tree into PartTreeFromKey by key; //get part of tree stored with key
                for (each v in PartTreeFromKey)
                        insert v into Tree; // insert v into Tree
                end for;
        end for;
return;
```

Algorithm 2 may be a simple and efficient algorithm for determining a P2MP path across a plurality of domains. Further, a benefit of Algorithm 2 may be that information in one domain may be hidden from other domains. Algorithm 2 may have a few drawbacks, however. First, storing information belonging to a current domain may consume too much memory. Second, similar to algorithm 1, a Request may be sent among PCEs for different domains backwards and forwards since the result tree may grow in a first domain (e.g., Domain A), and then in a second domain (e.g., Domain B), and then in the first domain (e.g., domain A) again, and so on.

The following algorithm, referred to as Algorithm 3, may address a few of the above issues. When a PCE running Algorithm 3 sends a request to another PCE, it does not store almost all the information belonging to the domain in the PCE (responsible for the domain) with keys. It just stores the critical information belonging to the domain and sends the request to another PCE with the keys. In order to reduce Requests sent backwards and then forwards, a PCE computes path segments in the current domain, which are from entry boundary or source node to exit boundary or destination nodes in the current domain. Each of these path segments may be considered as a special link.

When a request is passed back to the PCE for the current domain, the computation of a P2MP path crossing multiple domains may be continued even though the information belonging to the current domain is NOT restored with the keys. For simplicity of description of the algorithm, the latter is used in the following. Alternatively, when a request passed back to the PCE for the current domain, the information belonging to the current domain can be restored through the keys, and the computation of the P2MP path crossing multiple domains may be continued. Through using the path segments computed before, time may be saved.

In Algorithm 3, when a PCE receives a request, the PCE decodes the request and then calls function P2 mpPathXDomains3, which is a function of Graph, Source, Dc, Ec, Destinations, Tree, and Candidates. Graph, Source, Destinations, Tree, and Candidates are described above. Dc contains all the destinations in the current domain not on Tree, and Ec contains all the exit boundary nodes of the current domain. Function P2 mpPathXDomains3 used in Algorithm 3 is provided below.

```
function P2mpPathXDomains3(Graph,Source,Dc,Ec,Destinations,Tree,Candidates):
        GraphI = Graph + {inter-domain links connected to current domain};
        DcLeft = Dc; EcLeft = Ec; pce = the pce for the current domain;
        u = element in Candidates with minimum cost;
        while (u.node is in Graph) // u.node is in the current domain
                remove u from Candidates; insert u into Tree;
                if (u.node is in Destinations) // if u.node is a destination
                        remove u.node from Destinations;
                        if (Destinations is empty) //if the shortest path from source to all
                                                  //destinations is found
                                send reply with the path to PCC/PCE from which request is
                                received;
                                return;
                        end if;
                        if (u.node is in DcLeft) remove u.node from DcLeft;
                    end if ; // shortest path to a destination in current domain found
                end if;
                if (u.node is in EcLeft) remove u.node from EcLeft;
                end if // shortest path to a boundary node in current domain found
                for (each neighbor v of u.node in GraphI and v is not in Tree):
                        alt = u.cost + cost-between(u.node, v); // get cost from source to v
                        if (Candidates does not contain x,where x.node == v)//if v not in Candidates
                                insert {v, alt, u.node, pce} into Candidates;
```

```
            else if (alt < v.cost) // if {v, cost, pre-hop, pce} in Candidates
                replace{v,cost, pre-hop,pce} in Candidates with{v,alt,u.node,pce};
                sort Candidates by cost;
            end if;
        end for;
        if (Candidates is not empty)
            u = element in Candidates with minimum cost;
        else // Tree cannot be extended any more
            send reply with failure to PCC/PCE from which request is received;
            return;
        end if;
    end while; // Here we have that u.node is not in Graph (i.e., current domain)
    Tree2send={{node,cost,prehop,pce}|{node,cost,prehop,pce} in Tree & node not in Graph};
    // Tree2send is the part of Tree not having any node in the current domain
    BoundaryDestInTree = Dc + Ec − DcLeft − EcLeft;
    // store each of path segments in Tree in PCE with a key, which is
    // from entry boundary or source node of current domain
    // to exit boundary or destination node of current domain
    store-path-segments(Graph,Source,BoundaryDestInTree,Tree,Segments-keyed);
    // each of path segments keyed as a special link is added into Tree2send
    Tree2send = Tree2send + Segments-keyed;
    BounaryDest = EcLeft + DcLeft; //boundary, destinations in current domain not on Tree
    TreeC = Tree; // Copy the result Tree to TreeC
    CandidatesC ={{node,cost,ph,pce}|{node,cost,ph,pce} in Candidates & node in Graph};
    // CandidatesC is set to contain the candidates in the current domain
    // Find shortest paths to nodes in BoundaryDest in current domain and not on Tree
    DijkstraC(Graph, Source, BoundaryDest, TreeC, CandidatesC);
    Candidates2send ={{n,c,ph,pce}|{n,c,ph,pce} in Candidates & n not in Graph};
    // Candidates2send is the part of Candidates not having any node in the current domain
    // store each of path segments in TreeC in PCE with a key, which is
    // from entry boundary or source node of current domain
    // to exit boundary or destination node of current domain
    store-path-segments(Graph, Source, BoundaryDest, TreeC, Segments-keyed);
    // each of path segments keyed as a special link is added into Candidates2send
    Candidates2send = Candidates2send + Segments-keyed;
    Send a request to PCE responsible for the domain containing u.node;
    // the request contains Source, Destinations, Tree2send, Candidates2send;
Return;
```

When PCE receives a reply with the result, it forwards the reply to the PCC/PCE from which a request for computing a path for a P2MP LSP crossing domains is received. Function P2 mpPathXDomains3 in Algorithm 3 relies on functions DijkstraC and store-path-segments, which are provided below.

```
function DijkstraC(Graph, Source, Destinations, Tree, Candidates):
    u = element in Candidates with minimum cost;
    pce = the pce responsible for the current domain;
    while (Candidates is not empty) // We can grow Tree
        remove u from Candidates;
        insert u into Tree;
        if (u.node is in Destinations)
            remove u.node from Destinations;
            if (Destinations is empty) //If shortest path from source to all destinations is
                                      //found
                return;
            end if;
        end if;
        for (each neighbor v of u.node in Graph and v is not in Tree):
            alt = u.cost + cost-between(u.node, v);
            if (Candidates does not contain x,where x.node == v)//if v not in Candidates
                insert {v, alt, u.node, pce} into Candidates;
            else if (alt < v.cost) //if {v,cost,pre-hop,pce} in Candidates
                replace{v,cost,pre-hop,pce} in Candidates with{v,alt,u.node,pce};
                sort Candidates by cost;
            end if;
        end for;
    end while; //Tree cannot grow in Graph (i.e., current domain) any more
    Return;
function store-path-segments(Graph, Source, Destinations, Tree, Segments-keyed):
    TreeTemp = Tree; // Copy Tree to TreeTemp
    Segments-keyed = { }; // Initialize Segments-keyed to empty
    // get path segments from source (entry boundary) node to destination (exit boundary) node
    // remove the segments from Tree, store the segments in PCE with keys
    //add {key,exit-boundary/destination,cost,entry-boundary/source,pce} into Segments-keyed
    for (each u in Tree2temp and u.node in Graph and u.node is destination or boundary node)
        remove u from Tree2temp;
```

```
        PathSegment2key = {u};
        b = u.node; cost = u.cost; // remember the end point and cost of the path
        for (each v in Tree2temp and v.node in Graph and v.node == u.pre-hop)
                remove v from Tree2temp;
                add v into PathSegment2key;
                u = v;
                if (v.node is a boundary node or source)
                        store PathSegment2key in PCE and get a key for accessing it later;
                        add element {key, b, cost, v.node, pce} into Segments-keyed;
                        break;
                end if;
        end for;
    end for;
return;
```

Algorithms 1, 2, and 3 do not require a core tree of domains and each results in a shortest MPLS P2MP LSP path across a plurality of domains (i.e., a computed path from a source to a destination is a shortest path or optimum path from the source to the destination; for n destinations, where n is an integer greater than one, there may be n paths, each of which is the shortest path from the source to the destination).

The following describes another embodiment for determining a P2MP path across a plurality of domains. Suppose that the following variables are defined: a current PCE named as CurrentPCE which is currently computing the path; a number of rest destination nodes may be named as RestDestinationNodes, which is the number of destination nodes to which shortest paths are to be found (RestDestinationNodes initially (e.g., at the time of initial request from source node) may be the number of all the destination nodes of an MPLS TE P2MP LSP); and a candidate node list named as CandidateNodeList, which contains the nodes that may be on the shortest path from the source node to a destination node. Each node C in CandidateNodeList may have the following information: the cost of the path from the source node to node C, the previous hop node P and the link between P and C, the PCE responsible for C, and the flags for C. The flags may include: bit D indicating that node C is a Destination node if it is set; bit S indicating that C is the Source node if it is set; bit E indicating that C is an Exit boundary node if it is set; bit I indicating that C is an entry boundary node if it is set; and bit T indicating that C is a node on the shortest result path Tree if it is set.

The nodes in CandidateNodeList may be ordered by path cost. Initially, CandidateNodeList may contain only a Source Node, with path cost zero, the PCE responsible for the source domain, and flags with S bit set.

A result path list or tree may be named as ResultPathTree, which contains the shortest paths from the source node to the boundary nodes or the destination nodes. Initially, ResultPathTree is empty.

Figure 4:
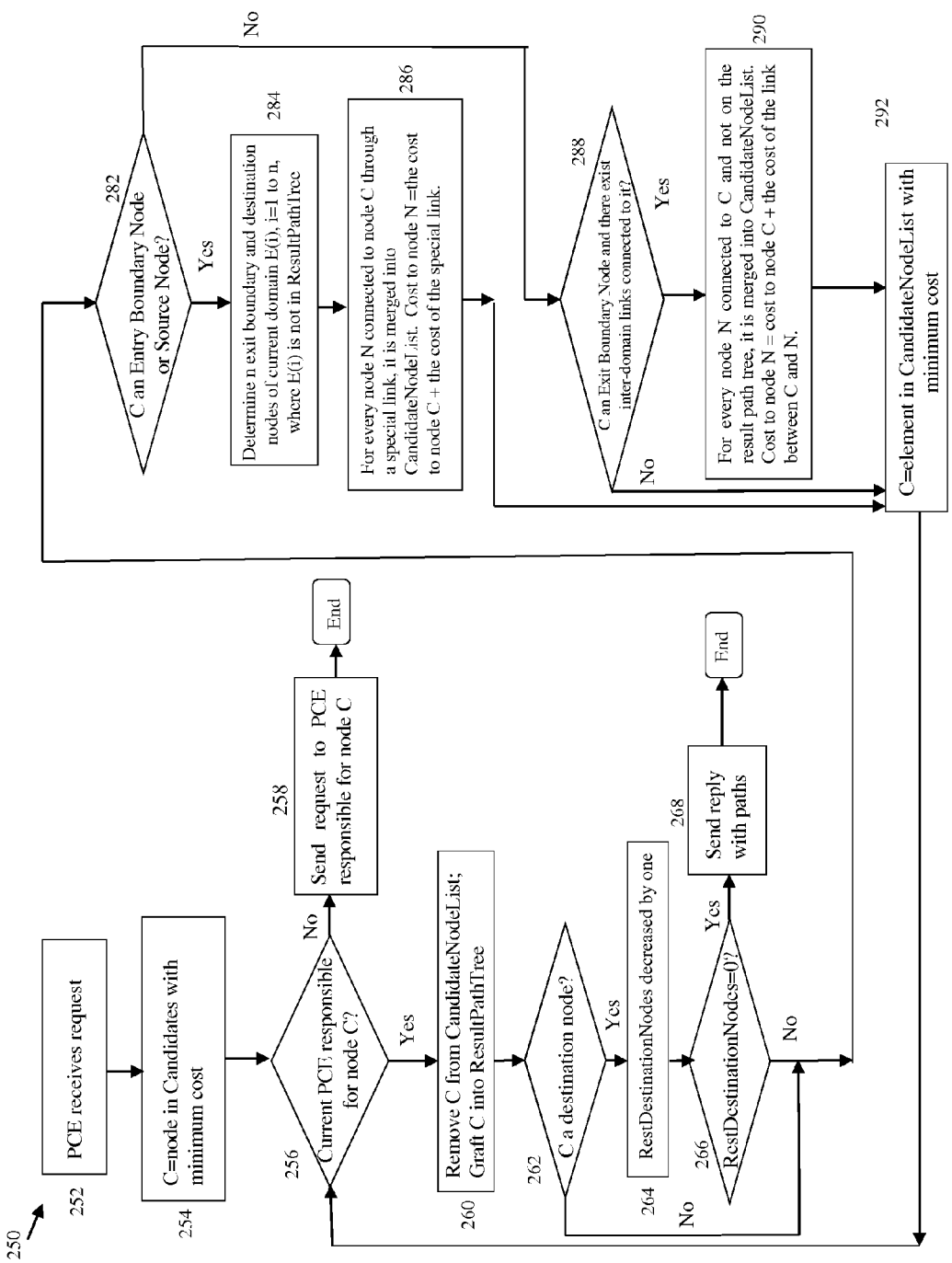
FIG. 4 is an embodiment of a third method for determining a P2MP path across a plurality of domains.

A Forward Search path computation method for computing a path for an MPLS TE P2MP LSP crossing a number of domains from a source node to a number of destination nodes may be described as follows. The method may be described with reference to FIG. 4, which is an embodiment of a third method 250 for determining a P2MP path across a plurality of domains. Many of the steps in method 250 are similar to corresponding steps in method 200, thus the steps in method 250 will be discussed below in reduced detail. Initially (e.g., when a node needs a MPLS TE P2MP LSP), a PCC may set RestDestinationNodes equal to the number of all the destination nodes of the MPLS TE P2MP LSP, may set ResultPathTree as empty, and may designate CandidateNodeList as containing the source node. The PCC may send a PCE responsible for the source domain a request with the source node, RestDestinationNodes, CandidateNodeList and ResultPathTree. When the PCE responsible for a domain (called current domain) receives a request (see, e.g., step 252) for computing the path for the MPLS TE P2MP LSP, it checks whether the current PCE is the PCE responsible for the domain containing the node C with the minimum cost in the CandidateNodeList (see steps 254 and 256). If it is, then C may be removed from CandidateNodeList and grafted into ResultPathTree (see step 260); otherwise, a request (sometimes referred to as a PCReq) message is sent to the PCE for node C (see step 258).

Suppose that node C is in the current domain. A ResultPathTree may be constructed from C in the following steps.

If node C is a destination node (i.e., the Destination Node (D) bit in the Flags is set), then RestDestinationNodes is decreased by one (see steps 262 and 264). If RestDestinationNodes is zero (i.e., all the destinations are on the result path tree), then the shortest path is found and a reply message with the path may be sent to the PCE/PCC which sends the request to the current PCE (see steps 266 and 268).

If node C is an Entry Boundary Node or Source Node (i.e., the Entry/Incoming Boundary Node (I) bit or the Source Node (S) bit is set), then path segments from node C to every exit boundary node and every destination node of the current domain that is not on the result path tree are computed through using CSPF and as special links. For every node N connected to node C through a special link (i.e., a path segment), it is merged into CandidateNodeList. The cost to node N is the sum of the cost to node C and the cost of the special link (i.e., path segment) between C and N. The PCE for node N is the current PCE if node N is an ASBR; otherwise (node N is an ABR, an exit boundary node of the current domain and an entry boundary node of the domain next to the current domain) the PCE for node N is the PCE for the next domain. (See steps 282, 284, and 286.)

If node C is an Exit Boundary Node (i.e., the Exit Boundary Node (E) bit is set or an ASBR) and there exists inter-domain links connected to it, then for every node N connected to C and not on the result path tree, it is merged into the candidate node list. The cost to node N is the sum of the cost to node C and the cost of the link between C and N. The PCE for node N is the PCE responsible for the domain containing node N. (See steps 288 and 290.)

If the CurrentPCE is the same as the PCE of the node D with the minimum cost in CandidateNodeList, then the node D is removed from CandidateNodeList, grafted to ResultPathTree (e.g., through setting flag bit T of node D to one), and the above steps are repeated; otherwise, the CurrentPCE sends the PCE for node D a request with the source node, RestDestinationNodes, CandidateNodeList and ResultPathTree. (See steps 292, 256, 258, and 260.) The method 250 does not require a core tree of domains and results in a shortest MPLS P2MP LSP path across a plurality of domains (i.e., a computed path from a source to a destination is a shortest path or optimum path from the source to the destination; for n destinations, where n is an integer greater than one, there may be n paths, each of which is the shortest path from the source to the destination).

In the case that there is a PCE session between the current domain and the next domain containing node D, the Current-PCE directly sends the PCE for node D through the session a request message with the source node, RestDestinationNodes, CandidateNodeList and ResultPathTree.

In the case that there is not any PCE session between the current PCE and the PCE for node D, the current PCE may indirectly send a request message to the PCE for node D by sending a reply message towards a branch point on the result path tree from the current domain along the path that the request message goes from the PCC to the current PCE in reverse direction. The reply message contains the information about the source node, RestDestinationNodes, CandidateNodeList and ResultPathTree. From the branch point, there is a downward path to the domain containing the previous hop node of node D on the result path tree and to the domain containing node D. At this branch point, the request message is generated from the reply message and sent towards the PCE for node D along the downward path.

In another embodiment of a third method 250 for determining a P2MP path from a source node to a plurality of destination nodes across a plurality of domains, the information about the source node, the destination nodes and the result path list or tree may be represented in a candidate node list CandidateNodeList. Initially, a PCC may set CandidateNodeList as containing the source node and the destination nodes. The source node in CandidateNodeList is associated with the cost of zero and the Source Node (S) bit set to one. Each of the destination nodes in CandidateNodeList may be initially assigned a cost of effectively an infinite number (one example to represent an infinite number is to use a maximum number recognized by a computer) and the Destination Node (D) bit in the Flags set to one. The PCC may send a PCE responsible for the source domain a request with CandidateNodeList. The result path list or tree may be represented by the nodes each with a "node on the shortest result path Tree" (T) bit set to one in the candidate node list CandidateNodeList. If all the destination nodes in CandidateNodeList have T bit set to one, this indicates the shortest path from the source node to the destination nodes is found.

Figure 5:
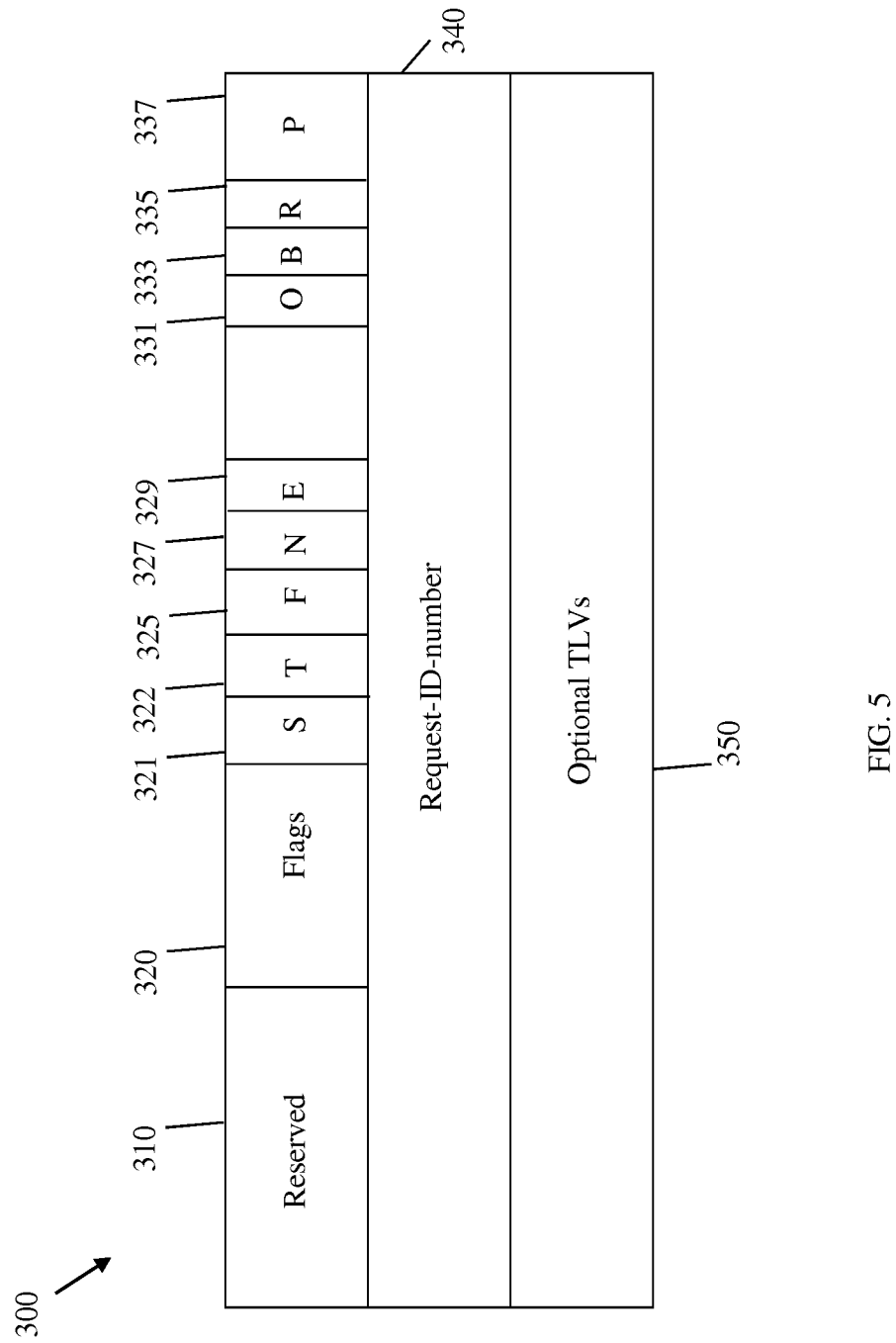
FIG. 5 is an illustration of one embodiment of a request/reply object body.

FIG. 5 is an illustration of one embodiment of a RP object body 300, which may be a part of a request message transmitted from a PCC or PCE to a PCE or a part of a reply message transmitted from a PCE to a PCC or PCE. The RP object may indicate a request or reply message is for Forward Search Path Computation. The RP object 300 may comprise a Reserved field 310, a plurality of Flags 320, and a Request-ID-number 340. Additionally, the RP object 300 may optionally comprise at least one optional type-length-value (TLV) 350, for instance to indicate path computation capabilities, path constraints, or other path information. The Flags 320 may comprise a forward Search path computation bit (S) flag 321 to indicate a Forward Search Path Computation for an MPLS TE LSP path, a transfer request bit (T) flag 322 to indicate that a reply message with this T flag set to one in RP object is a message for transferring a request message, a fragmentation bit (F) flag 325, a P2MP bit (N) flag 327, an explicit route object (ERO)-compression bit (E) flag 329, a Strict/Loose bit (O) flag 331, a Bi-directional bit (B) flag 333, a re-optimization (R) flag 335, and a plurality of Priority bit (P) flags 337. The Flags 320 may also comprise additional bits, which may be unassigned or reserved. For instance, the remaining bits may be set to zero and ignored. In an embodiment, each of the S flag 321, F flag 325, N flag 327, E flag 329, O flag 331, B flag 333, and R flag 335 may have a length of about one bit, the P flags 337 may have a combined length of about three bits, the Request-ID-number 340 may have a length of about 32 bits, and the Reserved field 310 may have a length of about eight bits.

In an embodiment, the S flag 321 may be set to indicate whether a request message or reply message is related to a forward Search path computation for an MPLS TE LSP path. Further, at least some of the fields of the RP object 300 may be configured based on the PCEP. For instance, the Reserved field 310 may be reserved for other purposes and/or may not be used. The O flag 331 may be set in a request message to indicate that a loose path is acceptable or may be cleared to indicate that a path comprising exclusively strict hops is required. On the other hand, the O flag 331 may be set in a reply message to indicate that the computed path is loose or may be cleared to indicate that the computed path comprises strict hops. The P flags 337 may be used to specify a recommended request priority. For instance, the P flags 337 may have a value from about one to about seven, which may be set locally at the PCC. Alternatively, the P flags 337 may be set to zero when the request priority is not specified. The Request-ID-number 340 may be combined with the source IP address of the PCC or the PCE network address to identify the backup egress computation request context. The Request-ID-number 340 may be changed or incremented each time a new request is sent to the PCE.

In another embodiment, the S flag 321 combined with the N flag 327 may indicate whether the request/reply is for computing a shortest path for an MPLS TE P2MP LSP using Forward Search Path Computation technique. For instance, both the S flag 321 and the N flag 327 are set to one to indicate that this is a request/reply message for computing a shortest path for an MPLS TE P2MP LSP using Forward Search Path Computation technique. The S flag 321 is set to one with the N flag 327 set to zero to indicate that this is a request/reply message for computing a shortest path for an MPLS TE P2P LSP using Forward Search Path Computation technique.

FIG. 6 is an illustration of one embodiment of a PCE IPv4 address object 360, which comprises an Object Length field 363, a Class-num field 365, a C-type field 367, and a PCE IPv4 address field 370. The Class-num field 365 and C-type field 367 may be used to identify an object. Fields by these names in other messages disclosed herein may be used in a similar manner. As shown, the value of Object Length field 363 in the PCE IPv4 address object may be eight, which is a length of the object 360 in bytes; the value of Class-num field 365 is 101 or may be assigned by Internet Assigned Numbers Authority (IANA); the value of C-type field 367 is one or may be assigned by IANA; and the value of the PCE IPv4 address field 370 comprises a PCE IPv4 address. The PCE IPv4 address object 360 may represent the IPv4 address of a PCE, with which a PCE session may be established and to which a request message may be sent. Other PCE IPv4 address objects 360 may represent the IPv4 addresses of other PCEs. Another embodiment of a PCE IPv4 address object may comprise a PCE IPv4 address, with which a PCE session may be established and to which a request message may be sent.

FIG. 7 is an illustration of one embodiment of a PCE IPv6 address object 380, which comprises an Object Length field 383, a Class-num field 385, a C-type field 387, and a PCE IPv6 address field 390. As shown, the value of Object Length field 383 in the PCE IPv6 address object may be 20, which is a length of the object in bytes; the value of Class-num field 385 is 101 or may be assigned by IANA; the value of C-type field 387 is 2 or may be assigned by IANA; and the value of the PCE IPv6 address field 390 comprises a PCE IPv6 address. The PCE IPv6 address object 380 represents the IPv6 address of a PCE, with which a PCE session may be established and to which a request message may be sent. Other PCE IPv6 address objects 380 may represent the IPv6 addresses of other PCEs. Another embodiment of a PCE IPv6 address object may comprise a PCE IPv6 address, with which a PCE session may be established and to which a request message may be sent.

Figure 8:
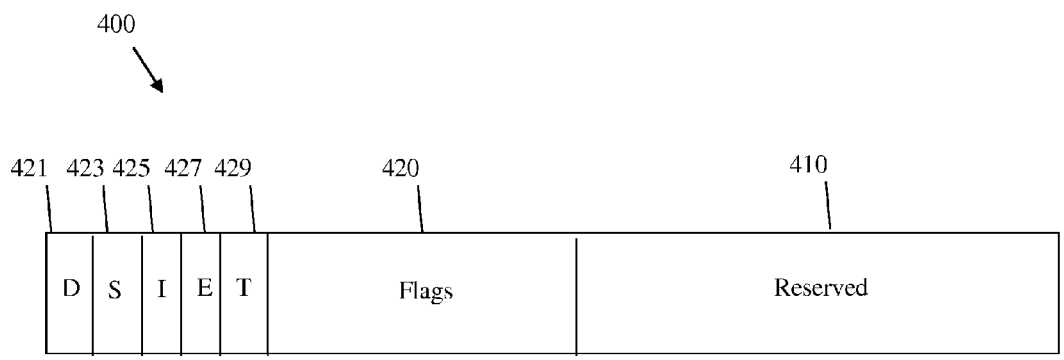
FIG. 8 is an illustration of one embodiment of a Node-Flags object body.

FIG. 8 is an illustration of one embodiment of a Node-Flags object body 400, which may be a part of a request message transmitted from a PCC or PCE to a PCE or a part of a reply message transmitted from a PCE to a PCC or PCE. The Node-Flags object may indicate the characteristics of the tail end node of a path in a list of candidate paths and a list of result paths in a request or reply message for Forward Search Path Computation. The Node-Flags object 400 may comprise a Reserved field 410, and a plurality of Flags 420. The Flags 420 may comprise a Destination node bit (D) flag 421 to indicate the tail end node of a path is a destination node, a Source node bit (S) flag 423 to indicate the tail end node of a path is a source node, an Incoming/entry boundary node bit (I) flag 425 to indicate the tail end node of a path is an entry boundary node, an Exit boundary node (E) flag 427 to indicate the tail end node of a path is an exit boundary node, and a node on a shortest path Tree bit (T) flag 429 to indicate the tail end node of a path is a node on a shortest path Tree. The Flags 420 may also comprise additional bits, which may be unassigned or reserved. For instance, the remaining bits may be set to zero and ignored. In an embodiment, each of the D flag 421, the S flag 423, the I flag 425, the E flag 427, and the T flag 429 may have a length of about one bit, and the Reserved field 410 may have a length of about sixteen or twenty-seven bits.

Alternatively, the Node-Flags object body 400 may indicate the characteristics of a node in a candidate node list in a request or reply message for Forward Search Inter-domain Path Computation. A value of D equal to one may indicate the node is a destination node. A value of S equal to one may indicate the node is a source node. A value of 1 equal to one may indicate the node is an entry boundary node. A value of E equal to one may indicate the node is an exit boundary node. A value of T equal to one may indicate the node is on the shortest path Tree.

Figure 9:
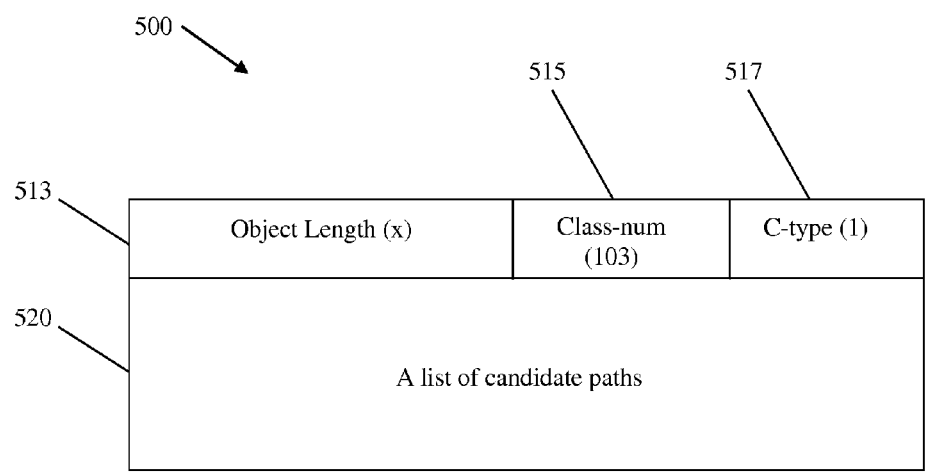
FIG. 9 is an illustration of one embodiment of a candidate-path-list object.

FIG. 9 is an illustration of one embodiment of a candidate-path-list object 500, which comprises an Object Length field 513, a Class-num field 515, a C-type field 517, and a list of candidate paths field 520. As shown, the value of Object Length field 513 in the candidate-path-list object may be x, which is a length of the object 500 in bytes and depends on contents of object body, which is a list of candidate paths; the value of Class-num field 515 is 103 or may be assigned by LANA; the value of C-type field 517 is one or may be assigned by LANA; and the value of the list of candidate paths field 520 comprises a list of candidate paths. Each path in the list of candidate paths represents a path from the source node to a tail end node, which has the same or similar format of a path defined in RFC 5440, which is hereby incorporated by reference.

Figure 10:
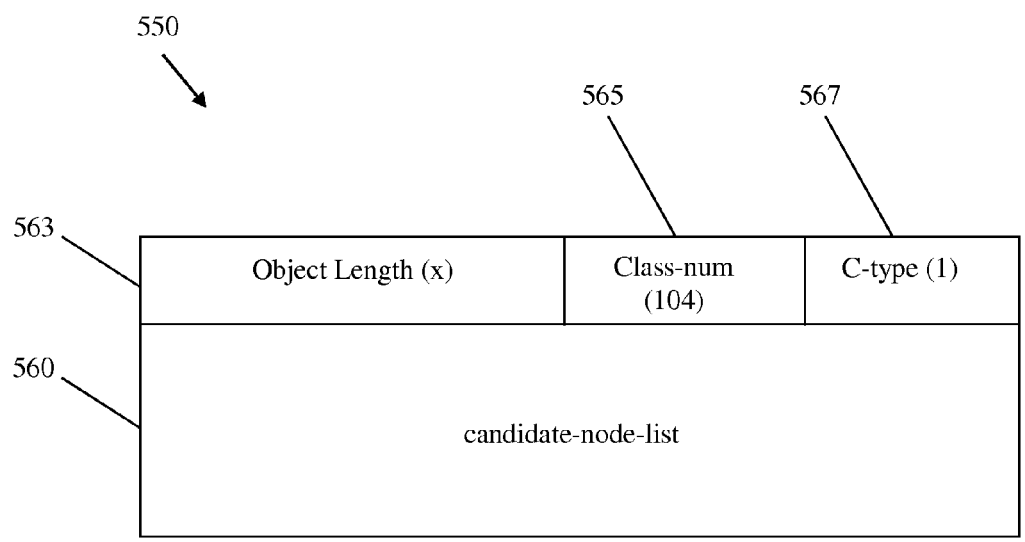
FIG. 10 is an illustration of one embodiment of a candidate-node-list-obj.

FIG. 10 is an illustration of one embodiment of a candidate-node-list-obj object 550, which comprises an Object Length field 563, a Class-num field 565, a C-type field 567, and a candidate-node-list field 560. As shown, the value of Object Length field 563 in the candidate-node-list-obj object may be x, which is a length of the object 550 in bytes and depends on contents of object body, which is a candidate-node-list; the value of Class-num field 565 is 104 or may be assigned by IANA; the value of C-type field 567 is one or may be assigned by IANA; and the value of the list of candidate nodes field 560 comprises a list of candidate nodes. The following may be a definition of the candidate-node-list.

```
<candidate-node-list>::=  <candidate-node>  [<candidate-
                                            node-list>]
<candidate-node>::=<ERO>
                       <candidate-attribute-list>
<candidate-attribute-list>::=[<attribute-list>] [<PCE>]
                                     [<Node-Flags>]
```

The ERO in a candidate node may contain just the path segment of the last link of the path, which is from a previous hop node of the tail end node of the path to the tail end node. With this information, we may graft the candidate node into the existing result path list or tree.

A candidate node may have the same or similar format of a path defined in RFC 5440, but the ERO in the candidate node may just contain the tail end node of the path and its previous hop, and the candidate node may contain two new objects PCE and node flags.

Figure 11:
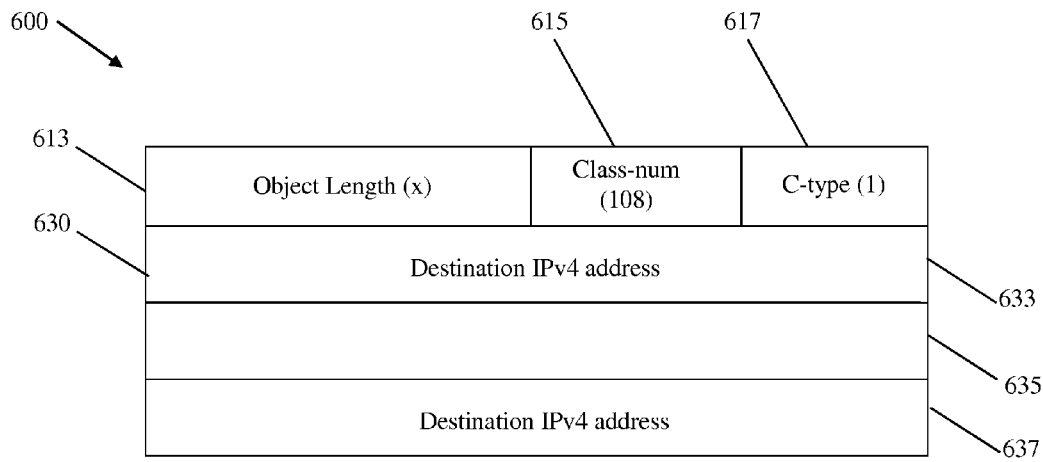
FIG. 11 is an illustration of one embodiment of a destination IPv4 addresses object.

FIG. 11 is an illustration of one embodiment of a destination IPv4 addresses object 600, which comprises an Object Length field 613, a Class-num field 615, a C-type field 617, and a list of destination IPv4 addresses 630. As shown, the value of Object Length field 613 in the destination IPv4 addresses object may be x, which is a length of the object 600 in bytes and depends on contents of object body, which is a list of destination IPv4 addresses; the value of Class-num field 615 is 108 or may be assigned by IANA; the value of C-type field 617 is one or may be assigned by IANA; and the value of the list of destination IPv4 addresses field 630 comprises a list of destination IPv4 address fields 633 to 637. The destination IPv4 addresses given in the fields from 633 to 637 represent that the paths to these destinations need to be computed.

Figure 12:
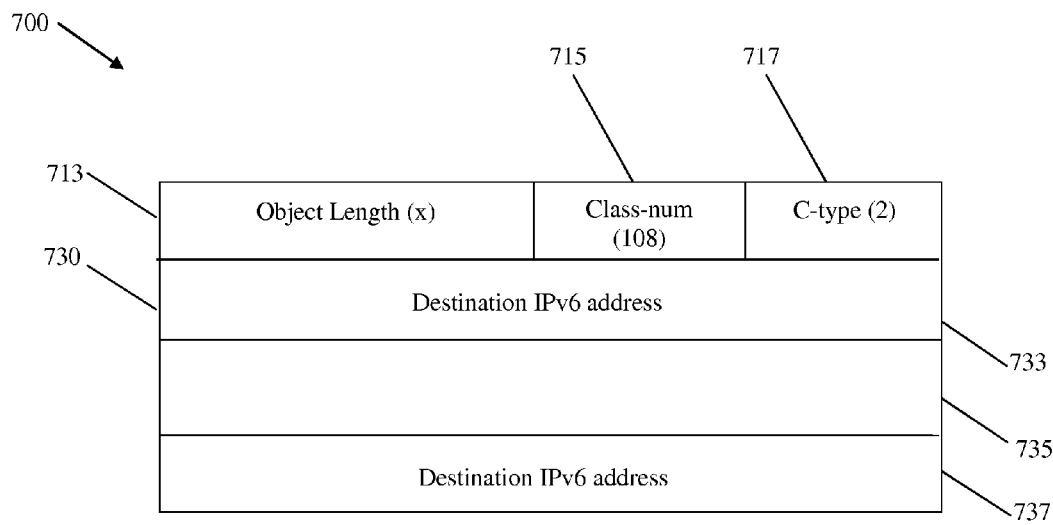
FIG. 12 is an illustration of one embodiment of a destination IPv6 addresses object.

FIG. 12 is an illustration of one embodiment of a destination IPv6 addresses object 700, which comprises an Object Length field 713, a Class-num field 715, a C-type field 717, and a list of destination IPv6 addresses 730. As shown, the value of Object Length field 713 in the destination IPv6 addresses object may be x, which is a length of the object 700 in bytes and depends on contents of object body, which is a list of destination IPv6 addresses; the value of Class-num field 715 is 108 or may be assigned by IANA; the value of C-type field 717 is two or may be assigned by IANA; and the value of the list of destination IPv6 addresses field 730 comprises a list of destination IPv6 address fields 733 to 737. The destination IPv6 addresses given in the fields from 733 to 737 represent that the paths to these destinations need to be computed.

Figure 13:
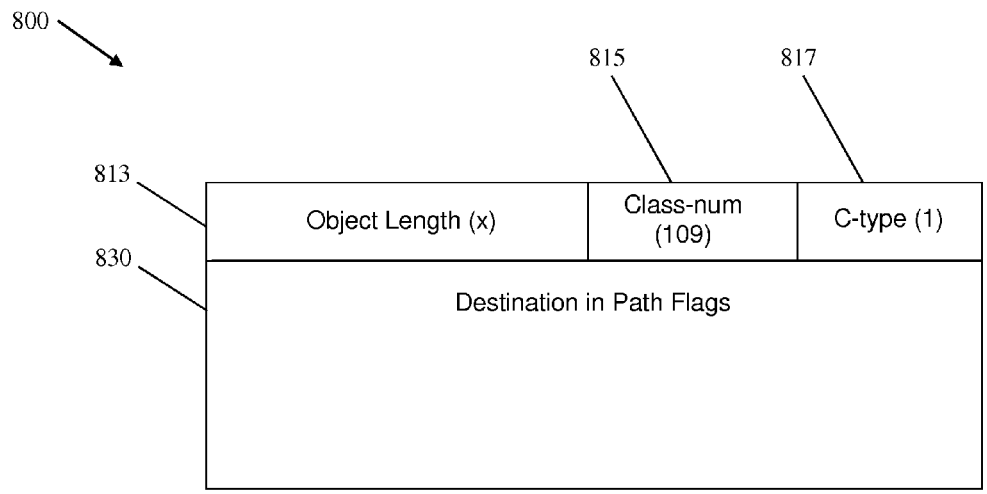
FIG. 13 is an illustration of one embodiment of a destination in path flags object.

FIG. 13 is an illustration of one embodiment of a destination in path flags object 800, which comprises an Object Length field 813, a Class-num field 815, a C-type field 817, and a sequence of destination in path flags 830. As shown, the value of Object Length field in the destination in path flags object may be x, which is a length of the object in bytes and depends on contents of object body, which is a sequence of destination in path flags; the value of Class-num field is 109 or may be assigned by IANA; the value of C-type field is 1 or may be assigned by IANA; and the value of the sequence of destination in path flags field 830 comprises a sequence of 32-bit words, each of which contains a sequence of 32 flags. Regarding a sequence of destinations represented in END- POINTS objects in a request message, the sequence of destination in path flags corresponds to the sequence of destinations in the END-POINTS objects. For each destination in the sequence of destinations, there is a flag in the destination in path flags, which indicates whether a shortest path to the destination needs to be computed. In one instance, the flag for a destination may be set to zero to indicate that a shortest path to the destination needs to be computed; and the flag for a destination may be set to one to indicate that the shortest path to the destination has been founded.

Figure 14:
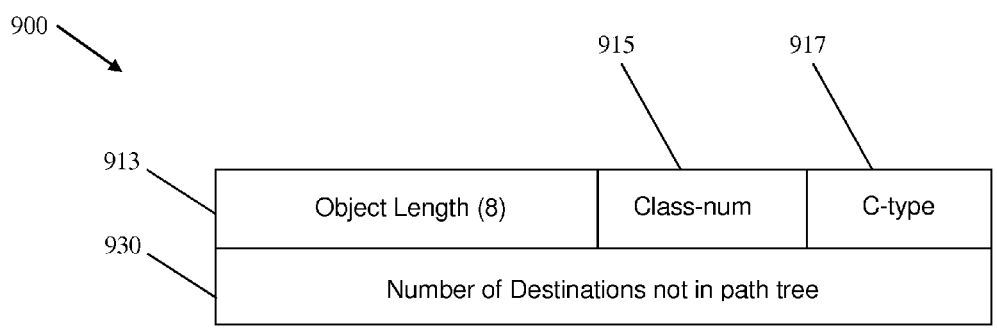
FIG. 14 is an illustration of one embodiment of a number of destinations not in path object.

FIG. 14 is an illustration of one embodiment of a number of destinations not in path object 900, which comprises an Object Length field 913, a Class-num field 915, a C-type field 917, and a number of destinations not in path 930. As shown, the value of Object Length field 913 in the object may be eight, which is a length of the object 900 in bytes; the value of Class-num field 915 may be 110 or may be assigned by IANA; the value of C-type field 917 may be one or may be assigned by IANA; and the value of the number of destinations not in path tree field 930 comprises a number, which is the number of destinations that are not in the final path computed yet.

Below is the message format for a request message with the extensions of rest destination nodes, a result path list and a candidate path list:

```
<PCReq Message>::= <Common Header> [<svec-list>]
                   <request-list>
<request-list>::=<request>[<request-list>]
<request>::= <RP>
                   <END-POINTS>
                   [<OF>]
                   [<LSPA>]
                   [<BANDWIDTH>]
                   [<metric-list>]
                   [<RRO>[<BANDWIDTH>]]
                   [<IRO>]
                   [<LOAD-BALANCING>]
                   [<result-path-list>]
                   [<candidate-node-list-obj>]
                   [<rest-destination-nodes>]
where:
       <result-path-list>::=<path>[<result-path-list>]
       <path>::=<ERO><attribute-list>
       <attribute-list>::=    [<LSPA>]
                              [<BANDWIDTH>]
                              [<metric-list>]
                              [<IRO>]
<candidate-node-list-obj>contains a <candidate-node-list>
<candidate-node-list>::=              <candidate-node>
                                      [<candidate-node-list>]
<candidate-node>::= <ERO>
                   <candidate-attribute-list>
<candidate-attribute-list>::= [<attribute-list>]
                              [<PCE>]
                              [<Node-Flags>]
```

A definition for the result path list that may be added into a request message may be the same as that for the path list in a reply message that is described in RFC5440.

Although the methods and systems have been described mainly in terms of determining a P2MP path for establishing a MPLS P2MP LSP, the methods and systems apply more generally to multi-domain networks employing point-to-multipoint communication to determine a P2MP path. For example, the network 100 in FIG. 1 may more generally have a server or application, instead of a PCE, responsible for each domain. The multi-domain topology may remain the same. Further, the methods 190, 200, and 250 may be adapted by a person of ordinary skill in the art to other types of multi-domain networks that employ P2MP communication.

Figure 15:
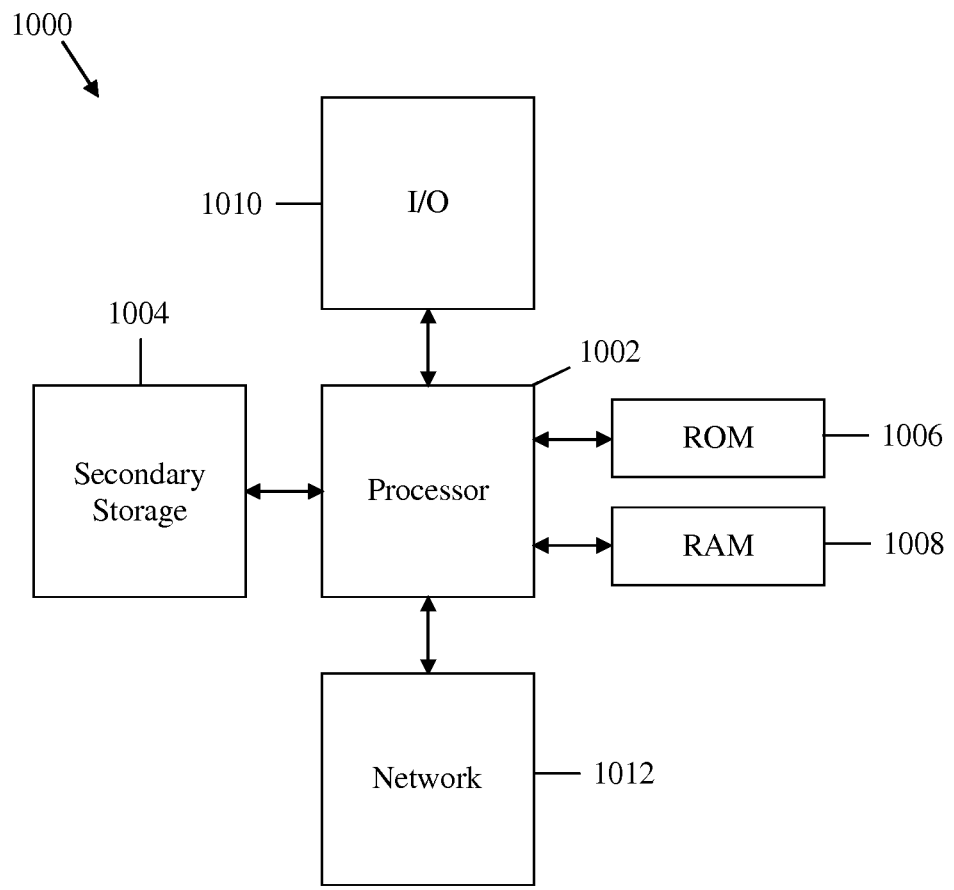
FIG. 15 is a schematic diagram of an embodiment of a network component.

The network components, methods, and procedures described above may be implemented on any general-purpose network component, such as a computer or network component with sufficient processing power, memory resources, and network throughput capability to handle the necessary workload placed upon it. FIG. 15 illustrates a typical, general-purpose network component 1000 suitable for implementing one or more embodiments disclosed herein. The network component 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, or may be part of one or more application specific integrated circuits (ASICs) and/or digital signal processors (DSPs).

The secondary storage 1004 is typically comprised of one or more disk drives or erasable programmable ROM (EPROM) and is used for non-volatile storage of data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004.

Network component 1000 may be a PCE or may implement functionality of a PCE. For example, network component 1000 may implement any of the algorithms, methods, or procedures presented previously, such as Algorithm 1, Algorithm 2, or Algorithm 3, or methods 190, 200, and 250 described with respect to FIGS. 2, 3, and 4, respectively. I/O devices 1010 or network connectivity devices 1012 may comprise one or more ingress ports for receiving data, such as a request described in method 200, Algorithm 1, Algorithm 2, and Algorithm 3. Further, I/O devices 1010 or network connectivity devices 1012 may comprise one or more egress ports for transmitting data, such as a request or reply described in methods 190, 200, and 250 in FIGS. 2, 3, and 4, respectively, as well as Algorithm 1, Algorithm 2, and Algorithm 3 described previously. Network component 1000 may implement any of the messages or objects discussed with respect FIGS. 5-14.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
a processor configured to:
receive a request from a network entity for computing a path for a Multiprotocol Label Switching (MPLS) Point-to-Multipoint (P2MP) Label Switched Path (LSP), wherein the request comprises ResultPathTree, RestDestinationNodes, and CandidateNodeList;
determine a node C with minimum cost based on CandidateNodeList;
determine whether a current Path Computation Element (PCE) is a PCE responsible for node C, and, if so, remove C from CandidateNodeList, graft it into ResultPathTree, and grow the ResultPathTree from node C, and, if not, send a request message to a responsible PCE responsible for node C.

2. The apparatus of claim 1, wherein RestDestinationNodes is a number of destination nodes to which a shortest path needs to be determined, wherein ResultPathTree contains shortest paths from a source node to a plurality of boundary nodes and some of destination nodes, and wherein CandidateNodeList contains one or more nodes through which a shortest path may traverse.

3. The apparatus of claim 2, wherein growing the ResultPathTree comprises:
decreasing RestDestinationNodes by one if node C is a destination node;
determining a shortest path if RestDestinationNodes is zero; and
sending a reply message with the shortest path to the network entity from which the request is received.

4. The apparatus of claim 3, wherein the reply message comprises a Request Parameters (RP) object comprising an S bit set to one indicating that the reply message is a reply for Forward Search Path Computation.

5. The apparatus of claim 1, wherein growing the ResultPathTree further comprises:
determining whether node C is an entry boundary node or a source node;
if C is an entry boundary node or the source node, computing path segments from node C to every exit boundary node and every destination node of the current domain that is not in ResultPathTree using constrained shortest path first (CSPF), designating the path segments as special links, merging every node N connected to node C through a special link into CandidateNodeList, and associating a cost with node N equal to the cost to node C plus the cost of the link between node C and node N.

6. The apparatus of claim 5, wherein growing the ResultPathTree further comprises:
determining whether node C is an exit boundary node and whether there are inter-domain links connected to node C;
if C is an exit boundary node and there are inter-domain links connected to node C, for every node N connected to node C and not in ResultPathTree, merging node N into CandidateNodeList, and associating a cost with node N equal to the cost to node C plus the cost of the link between node C and node N.

7. The apparatus of claim 6, wherein the processor is further configured to:
determine a new node C with minimum cost based on CandidateNodeList;
determine whether the current PCE is a PCE responsible for new node C, and, if so, remove new node C from CandidateNodeList, graft it into ResultPathTree, and grow the ResultPathTree from new node C, and, if not, send a new request message to the PCE responsible for new node C.

8. The apparatus of claim 2, wherein each candidate node in CandidateNodeList has thefollowing information:
a cost of a path from a source node to the node C;
a previous hop node and the link between the previous hop node and the node C;
the PCE responsible for the node C;
a first flag indicating that the node C is a destination node if it is set;
a second flag indicating that the node C is the source node if it is set;
a third flag indicating that the node C is an exit boundary node if it is set;
a fourth flag indicating that the node C is an entry boundary node if it is set; and
a fifth flag indicating that the node C is on the shortest path tree if it is set.

9. The apparatus of claim 1, wherein a plurality of nodes within the CandidateNodeList are ordered by path cost, wherein the CandidateNodeList initially contains a source node, a path cost of zero, a PCE responsible for a source domain, and an S bit flag set, and wherein the ResultPathTree is initially empty.

10. A method for computing a path, the method comprising:
  receiving a request for computing a path for a Multiprotocol Label Switching (MPLS) Point-to-Multipoint (P2MP) Label Switched Path (LSP), wherein the request comprises a ResultPathTree and a CandidateNodeList;
  determining a candidate node with minimum cost based on the CandidateNodeList;
  checking whether a current Path Computation Element (PCE) is a PCE responsible for the candidate node;
  removing the candidate node from the CandidateNodeList when the current PCE is the PCE responsible for the candidate node;
  grafting the candidate node into the ResultPathTree when the current PCE is the PCE responsible for the candidate node; and
  transmitting a request message to a second PCE that is response for the candidate node when the current PCE is not the PCE responsible for the candidate node.

11. The method of claim 10, wherein ResultPathTree comprises a plurality of shortest paths from a source node to a plurality of boundary nodes and a plurality of destination nodes, and wherein CandidateNodeList comprises one or more nodes through a temporary optimal path from the source node.

12. The method of claim 11, wherein each candidate node in CandidateNodeList comprises:
  a cost of a path from a source node to the candidate node;
  a previous hop node and the link between the previous hop node and the candidate node;
  the PCE responsible for the candidate node;
  a first flag that is set to indicate that the candidate node is a destination node;
  a second flag that is set to indicate that the candidate node is the source node;
  a third flag that is set to indicate that the candidate node is an exit boundary node;
  a fourth flag that is set to indicate that the candidate node is an entry boundary node; and
  a fifth flag that is set to indicate that the candidate node is on the shortest path tree.

13. The method of claim 10, wherein the request further comprises a RestDestinationNodes field, wherein a number of destination nodes are named within the RestDestinationNodes field, and wherein the method further comprises determining whether all of the destination nodes are on the ResultPathTree when the candidate node is a destination node.

14. The method of claim 10, further comprising building the ResultPathTree from the candidate node by:
  checking whether the candidate node is an entry boundary node or a source node; and
  computing path segments from candidate node to one or more exit boundary nodes and one or more destination nodes of a current domain that is not in the ResultPathTree using constrained shortest path first (CSPF) and a plurality of special links,
  wherein a plurality of merging nodes connected to the candidate node through one of the special links are merged into the CandidateNodeList, and
  wherein a cost of one of the merging nodes is the sum of the cost to the candidate node and the cost of the one of the special links between the candidate node and the one of the merging nodes.

15. The method of claim 10, further comprising building the ResultPathTree from the candidate node by:
  checking whether the candidate node is an exit boundary node and whether a plurality of inter-domain links are connected to the candidate node; and
  merging a plurality of merging nodes not on the ResultPathTree into the CandidateNodeList when the candidate node is an exit boundary node,
  wherein a cost of one of the merging nodes is the sum of the cost of the candidate node and the cost of the one of the special links between the candidate node and the one of the merging nodes.

16. A computer program product comprising computer executable instructions stored on a non-transitory computer readable medium that when executed by a processor causes a Path Computation Element (PCE) to perform the following:
  receive a request to compute a path for a Multiprotocol Label Switching (MPLS) Point-to -Multipoint (P2MP) Label Switched Path (LSP), wherein the request comprises a ResultPathTree and a CandidateNodeList;
  determine a candidate node associated with a minimum cost from the CandidateNodeList;
  determine whether the PCE is responsible for a domain that the candidate node is located within;
  remove the candidate node from the CandidateNodeList based upon the determination that the PCE is responsible for the domain the candidate node is located within;
  graft the candidate node into the ResultPathTree based upon the determination that the PCE is responsible for the domain the candidate node is located within; and
  transmit a request message to a second PCE based upon the determination that the PCE is not responsible for the domain the candidate node is located within.

17. The computer program product of claim 16, wherein ResultPathTree comprises a plurality of shortest paths from a source node to a plurality of boundary nodes and a plurality of destination nodes, wherein CandidateNodeList comprises one or more nodes through a temporary optimal path from the source node, and wherein each candidate node in CandidateNodeList comprises:
  a cost of a path from a source node to the candidate node;
  a previous hop node and the link between the previous hop node and the candidate node;
  the PCE responsible for the candidate node;
  a first flag that is set to indicate that the candidate node is a destination node;
  a second flag that is set to indicate that the candidate node is the source node;
  a third flag that is set to indicate that the candidate node is an exit boundary node;
  a fourth flag that is set to indicate that the candidate node is an entry boundary node; and
  a fifth flag that is set to indicate that the candidate node is on the shortest path tree.

18. The computer program product of claim 16, wherein the request further comprises a RestDestinationNodes field, wherein the a number of destination nodes are named within the RestDestinationNodes field, and wherein the instructions, when executed by the processor, further cause the PCE to determine whether all of the destination nodes are on the ResultPathTree when the candidate node is a destination node.

19. The computer program product of claim 16, wherein the instructions, when executed by the processor, further cause the PCE to build the ResultPathTree from the candidate node by:

determining whether the candidate node is an entry boundary node or a source node;

computing path segments from candidate node to one or more exit boundary nodes and one or more destination nodes of a current domain that is not in the ResultPathTree using constrained shortest path first (CSPF) and a plurality of special links;

merging a plurality of merging nodes into the CandidateNodeList, wherein the merging nodes are connected to the candidate node via a plurality of special links, and wherein a cost of one of the merging nodes is the sum of the cost to the candidate node and the cost of the one of the special links between the candidate node and the one of the merging nodes.

20. The computer program product of claim 16, wherein the instructions, when executed by the processor, further cause the PCE to build the ResultPathTree from the candidate node by:

determining whether the candidate node is an exit boundary node and whether a plurality of inter-domain links are connected to the candidate node; and merging a plurality of merging nodes not on the ResultPathTree into the CandidateNodeList when the candidate node is an exit boundary node, wherein a cost of one of the merging nodes is the sum of the cost of the candidate node and the cost of the one of the special links between the candidate node and the one of the merging nodes.

\* \* \* \* \*

UNITED STATES PATENT AND TRADEMARK OFFICE
CERTIFICATE OF CORRECTION

PATENT NO. : 8,848,705 B2
APPLICATION NO. : 13/400513
DATED : September 30, 2014
INVENTOR(S) : Huaimo Chen Page 1 of 1

It is certified that error appears in the above-identified patent and that said Letters Patent is hereby corrected as shown below:

In the Claims

Column 24, Line 51, Claim 8 should read:

The apparatus of claim 2, wherein each candidate node in CandidateNodeList has the following information:
a cost of a path from a source node to the node C;
a previous hop node and the link between the previous hop node and the node C;
the PCE responsible for the node C;
a first flag indicating that the node C is a destination node if it is set;
a second flag indicating that the node C is the source node if it is set;
a third flag indicating that the node C is an exit boundary node if it is set;
a fourth flag indicating that the node C is an entry boundary node if it is set; and
a fifth flag indicating that the node C is on the shortest path tree if it is set.

Signed and Sealed this
Twenty-seventh Day of January, 2015

Michelle K. Lee
*Deputy Director of the United States Patent and Trademark Office*